(12) United States Patent
Singh et al.

(10) Patent No.: US 11,190,461 B2
(45) Date of Patent: Nov. 30, 2021

(54) MAPPING SERVICES TO TUNNELS IN ORDER TO FORWARD PACKETS USING A NETWORK DEVICE

(71) Applicant: Juniper Networks, Inc., Sunnyvale, CA (US)

(72) Inventors: Ravi Singh, San Jose, CA (US); Junan Chen, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 130 days.

(21) Appl. No.: 16/588,387

(22) Filed: Sep. 30, 2019

(65) Prior Publication Data

US 2021/0099401 A1 Apr. 1, 2021

(51) Int. Cl.
*H04L 12/937* (2013.01)
*H04L 12/851* (2013.01)
*H04L 29/06* (2006.01)

(52) U.S. Cl.
CPC ........ *H04L 49/254* (2013.01); *H04L 47/2441* (2013.01); *H04L 69/22* (2013.01)

(58) Field of Classification Search
None
See application file for complete search history.

(56) References Cited

U.S. PATENT DOCUMENTS

| 8,064,443 | B2 | 11/2011 | Scudder |
| 2003/0177221 | A1 | 9/2003 | Ould-Brahim et al. |
| 2004/0044789 | A1* | 3/2004 | Angel ............ H04L 47/805 709/238 |
| 2009/0003200 | A1* | 1/2009 | So .................. H04L 45/125 370/229 |
| 2015/0146536 | A1 | 5/2015 | Minei et al. |

(Continued)

FOREIGN PATENT DOCUMENTS

CN 101616051 B 9/2011

OTHER PUBLICATIONS

Previdi et al., "Advertising Segment Routing Policies in BGP," draft-ietf-idr-segment-routing-te-policy-07, Network Working Group, Internet-Draft, Jul. 5, 2019, 41 pp.

(Continued)

*Primary Examiner* — Ajit Patel
*Assistant Examiner* — Pamit Kaur
(74) *Attorney, Agent, or Firm* — Shumaker & Sieffert, P.A.

(57) ABSTRACT

This disclosure is related to devices, systems, and techniques for controlling a flow of network traffic between two or more devices. For example, a network device includes a control unit, a forwarding unit including a forwarding manager including a server configured to store a tunnel hierarchy structure, and a packet processor. The packet processor is configured to receive, via an interface card of a set of interface cards, a packet including a packet header. The forwarding manager is configured to parse the packet header in order to identify a service corresponding to the packet, wherein the service is associated with a service color, identify, based on the tunnel hierarchy structure, a set of tunnels, wherein each tunnel of the set of tunnels is associated with a tunnel color, and determine whether at least one tunnel of a set of tunnels associated with the tunnel color is in an online state.

18 Claims, 4 Drawing Sheets

(56) References Cited

U.S. PATENT DOCUMENTS

2017/0359247 A1\* 12/2017 Dixon .................. H04L 45/123

OTHER PUBLICATIONS

"ASA Border Gateway Protocol Configuration Example" Document ID: 118050, Cisco, Aug. 11, 2014, available at https://www.cisco.com/c/en/us/support/docs/security/asa-5500-x-series-next-generation-firewalls/118050-config-bgp-00.html (last accessed Jan. 30, 2020) 23 pp.
"Color-Based Mapping of VPN Services Overview" Tech Library, Juniper Networks, Inc., Accessed Oct. 14, 2019 from https://www.juniper.net/documentation/en_US/junos/topics/concept/color-based-mapping-of-vpn-services-overview.html, Sep. 19, 2011, 10 pp.
Shen et al. "BGP Flexible Color-Based Tunnel Selection" draft-shen-idr-flexible-color-tunnel-selection-00, Internet Engineering Task Force, Internet-Draft, Sep. 24, 2019, 12 pp.
"Example: Configuring a Routing Policy for Conditional Advertisement Enabling Conditional Installation of Prefixes in a Routing Table" TechLibrary, Juniper Networks, Inc., Accessed Oct. 14, 2019 from https://www.juniper.net/documentation/en_US/junos/topics/example/conditional-prefix-installing-configuring.html, Aug. 20, 2019, 26 pp.
"Resolution-map" TechLibrary, Juniper Networks, Inc., Accessed Oct. 14, 2019 from https://www.juniper.net/documentation/en_US/junos/topics/reference/configuration-statement/resolution-map-edit-policy-options.html, Sep. 24, 2019, 3 pp.
Mohapalra et al. "The BGP Encapsulation Subsequent Address Family Identifier (SAFI) and the BGP Tunnel Encapsulation Attribute" Network Working Group, RFC 5512, Apr. 2009, 13 pp.
Rekhter et al. "Carrying Label Information in BGP-4" Network Working Group, RFC 3107, May 2001, 8 pp.
Braden et al. "Resource Reservation Protocol (RSVP)—Version 1 Functional Specification," RFC 2205, Sep. 1997, 112 pp.
Patel et al. "The BGP Tunnel Encapsulation Attribute" draft-ietf-idr-tunnel-encaps-15.txt, IDR Working Group, Internet-Draft, Dec. 1, 2019, 26 pp.
Andersson et al. "LDP Specification" Network Working Group, RFC 5036, Oct. 2007, 135 pp.
Filsfils et al. "Segment Routing Architecture" Internet Engineering Task Force (ETF), RFC 8402, Jul. 2018, 32 pp.
U.S. Appl. No. 16/779,426, filed Mar. 31, 2020, naming inventors Singh et al.
Extended Search Report from counterpart European Application No. 19217036.3, dated Jun. 18, 2020, 10 pp.
Awduche et al., "RSVP-TE: Extensions to RSVP for LSP Tunnels," RFC 3209, Network Working Group, Dec. 2001, 61 pp.
Response to the Extended Search Report dated Jun. 18, 2020 from counterpart European Application No. 19217036.3, filed Sep. 29, 2021, 23 pp.

\* cited by examiner

MAPPING SERVICES TO TUNNELS IN ORDER TO FORWARD PACKETS USING A NETWORK DEVICE

TECHNICAL FIELD

The disclosure relates to computer networks.

BACKGROUND

A computer network is a collection of interconnected computing devices that exchange data and share resources. In a packet-based network the computing devices communicate data by dividing the data into small blocks called packets. Certain device within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets allows the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may allow remotely located sources and receivers to share data. Network service providers provide services such as linking customer sites through a network core (VPN services) or subscribers to a service, security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching.

SUMMARY

In general, the disclosure describes devices, systems, and techniques for controlling a flow of network traffic (e.g., packets) through one or more network devices. For example, a network device may receive packets via one or more ingress interface cards and forward packets via one or more egress interface cards, the one or more egress interface cards hosting a set of tunnels. The set of tunnels may, in some cases, connect the network device to another network device such that each tunnel of the set of tunnels leads from the network device to a common tunnel destination. The network device may maintain a tunnel hierarchy structure which allows the network device to select a tunnel or group of tunnels for forwarding a packet, the selected tunnel depending on a service associated with the packet. For example, each packet which arrives at the network device may include a packet header. The network device may parse the packet header to determine a service corresponding to the packet and subsequently "look up," in the tunnel hierarchy structure, a respective tunnel or group of tunnels in which to forward the packet. The network device may generate the tunnel hierarchy structure based on information received from a controller.

Services may correspond to one or more "service colors" and tunnels may correspond to one or more "tunnel colors." Colors, in some cases, are labels which identify a respective service or tunnel as being a part of a common type. For example, each tunnel that includes the color "blue" may be of a first type and each tunnel that includes the color "red" may be of a second type. In some examples, the tunnel hierarchy structure maps one or more service colors to one or more tunnel colors. For example, the tunnel hierarchy structure may indicate that packets associated with a particular service corresponding to a service color are to be forwarded over tunnels of a primary tunnel color. Additionally, the tunnel hierarchy structure may indicate that packets associated with the particular service are to be forwarded over tunnels of a secondary tunnel color if no tunnels of the primary tunnel color are available for carrying network traffic (e.g., if all of the tunnels of the primary tunnel color are offline). In this way, the tunnel hierarchy structure may include a ranking of tunnel colors for at least one service color, allowing the network device to forward a packet depending on the service associated with the packet. As used herein, the terms "primary" and "secondary" may indicate a priority of a respective tunnel color in comparison to other tunnel colors.

The techniques of this disclosure may provide one or more advantages. For example, it may be beneficial for a network device to forward network traffic associated with a service over a tunnel of a first tunnel type. Tunnels of the first tunnel type, in some cases, may be configured to carry traffic associated with the service more efficiently (e.g., carry more packets associated with the service, provide reduced latency to accommodate certain services, such as voice over Internet protocol—VoIP, streaming video, web conferencing, etc., provide high availability, and the like) than tunnels of a second tunnel type. Tunnels of the first tunnel type and tunnels of the second tunnel type may be labelled with a first tunnel color and a second tunnel color, respectively. As such, the network device may use the tunnel hierarchy structure to primarily forward network traffic over tunnels of the first (e.g., primary) tunnel color and forward network traffic over tunnels of the second (e.g., secondary) tunnel color if none of the tunnels of the first tunnel color are available for carrying packets.

Additionally, it may be beneficial for the network device to "load balance" network traffic across available tunnels of a common tunnel type. The network device may distribute packets associated with a service color over a set of tunnels of a tunnel color that is highest on the tunnel hierarchy structure for the respective service color. For example, if a set of N tunnels of the primary tunnel color for the respective service color are available for forwarding packets, the network device may divide packets associated with the respective service color substantially evenly over the set of N tunnels.

Moreover, it may be beneficial to allow fine-grained control for mapping specific network traffic to specific tunnels in a very general-purpose way. This may allow a controller to map relatively higher-value network traffic (e.g., network traffic that includes a low latency or network traffic that includes a lower loss-tolerance) to a first set of tunnels that are more reliable than second set of tunnels that are less reliable than the first set of tunnels. It may be beneficial to allow network transition scenarios where a controller may allow usage of specific tunnel types only for specific new service traffic without affecting pre-existing service traffic flows.

In some examples, a network device includes a control unit, a forwarding unit including a forwarding manager including a server configured to store a tunnel hierarchy structure, and a packet processor configured to receive, via an interface card of a set of interface cards, a packet including a packet header which indicates a service corresponding to the packet. The forwarding manager is configured to parse the packet header in order to identify the service corresponding to the packet, where the service is associated with a service color, identify, based on the tunnel hierarchy structure, a set of tunnels, where each tunnel of the set of tunnels is associated with a tunnel color, the tunnel hierarchy structure representing the tunnel color as a primary tunnel color corresponding to the service color, and determine whether at least one tunnel of the set of tunnels associated with the tunnel color is in an online state.

In some examples, a method includes receiving, by a packet processor of a forwarding unit, a packet via an interface card of a set of interface cards, the packet including a packet header which indicates a service corresponding to the packet, parsing, by a forwarding manager of the forwarding unit, the packet header in order to identify the service corresponding to the packet, where the service is associated with a service color, identifying, by the forwarding manager and based on a tunnel hierarchy structure stored in a server of the forwarding manager, a set of tunnels, where each tunnel of the set of tunnels is associated with a tunnel color, the tunnel hierarchy structure representing the tunnel color as a primary tunnel color corresponding to the service color, and determining, by the forwarding manager, whether at least one tunnel of the set of tunnels associated with the tunnel color is in an online state.

In some examples, a non-transitory computer-readable medium includes instructions for causing one or more programmable processors of a network device to receive, by a packet processor of a forwarding unit, a packet via an interface card of a set of interface cards, the packet including a packet header which indicates a service corresponding to the packet, parse, by a forwarding manager of the forwarding unit, the packet header in order to identify the service corresponding to the packet, where the service is associated with a service color, identify, by the forwarding manager and based on a tunnel hierarchy structure stored in a server of the forwarding manager, a set of tunnels, where each tunnel of the set of tunnels is associated with a tunnel color, the tunnel hierarchy structure representing the tunnel color as a primary tunnel color corresponding to the service color, and determine, by the forwarding manager, whether at least one tunnel of the set of tunnels associated with the tunnel color is in an online state.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
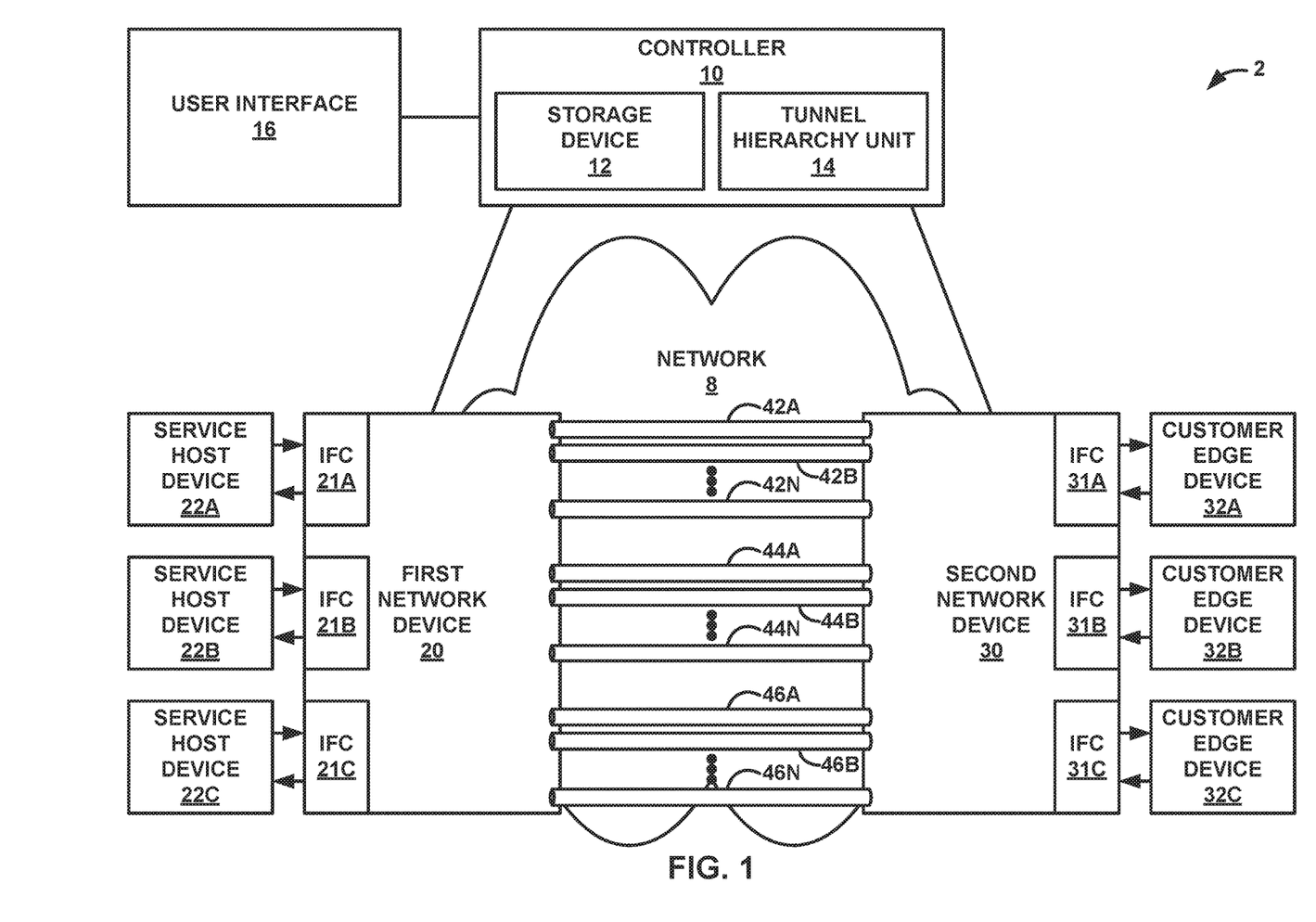
FIG. 1 is a block diagram illustrating a network system in which network traffic flows between a first network device and a second network device, in accordance with one or more techniques described herein.

FIG. 1 is a block diagram illustrating a network system 2 in which network traffic flows between a first network device 20 and a second network device 30, in accordance with one or more techniques described herein. As illustrated in FIG. 1, network system 2 includes controller 10, first network device 20, second network device 30, service host devices 22A-22C (collectively, "service host devices 22"), and customer edge (CE) devices 32A-32C (collectively, "CE devices 32") interconnected by a network 8. Network 8 offers packet-based connectivity to service host devices 22 and CE devices 32 attached to network 8 via first network device 20 and second network device 30 for accessing one or more services provided by service host devices 22. Network 8 may represent a public network that is owned and operated by a service provider to interconnect a plurality of networks. In some examples, network 8 may implement Multi-Protocol Label Switching (MPLS) forwarding and in such instances may be referred to as an MPLS network or MPLS backbone. In some instances, network 8 represents a plurality of interconnected autonomous systems, such as the Internet, that offers services from one or more service providers.

Network 8 includes, as shown in the example of FIG. 1, first network device 20 and second network device 30. First network device 20 may represent a provide edge (PE) network device, which may refer, as one example, to a router configured to interface with service host device 22 or other types of network devices, such as CE devices, in order to forward traffic via network 8. Second network device 20 may represent a PE network device, which again may refer to a router configured to interface with CE devices 32 or other types of network devices, such as service host devices, in order to forward network traffic via network 8.

Service host devices 22 may represent servers, databases, or other types of network devices that facilitate delivery of services via network 8. Although referred to as a single device, each of service host devices 22 may represent an ecosystem of one or more devices configured to provide a service, such as Voice over Internet Protocol (VoIP), streaming video, data analysis or analytics (for various purposes, including malware detection, virus detection, data mining, cryptography, etc.), machine learning, security—including authentication, authorization, and accounting (AAA), network address translation (NAT), encryption, decryption, or any other type of service capable of being provided via network 8. CE devices 32 may represent switches, hubs, routers, computing devices (including smartphones, laptops, desktops, workstations, etc.), gaming systems, smart speakers, smart televisions, or any other type of network capable device that is able to interface with second network device 30.

In some examples, network system 2 may use a tunnel hierarchy structure to determine packet flows between first network device 20 and second network device 30. For example, each of tunnels 42A-42N (collectively, "tunnels 42"), tunnels 44A-44N (collectively, "tunnels 44"), and tunnels 46A-46N (collectively, "tunnels 46") may provide a network overlay between first network device 20 and second network device 30. Each of tunnels 42, 44, and 46 may traverse network 8 via one or more hops (which is one example way of referring to intervening network devices supporting network 8 that are not shown in the example of FIG. 1 for ease of illustration purposes). Each of the tunnels 42, 44, 46 may present different characteristics in terms of bandwidth, latency, high availability (or, in other words, operational time characteristics), etc.

In examples where tunnels 42, 44, 46 include tunnels of different tunnel types, it may be difficult for an operator to configure network system 2 such that network traffic is forwarded over tunnels 42, 44, 46 which represent at least two different tunnel types. The tunnel hierarchy structure may resolve one or more complexities associated with forwarding network traffic between a pair of nodes that are connected by one or more tunnels that are associated with one or more tunnel types. For example, the tunnel hierarchy structure may make clear a preference of tunnels 24, 44, 46 for forwarding a packet associated with a particular service, thus streamlining network system 2 such that certain tunnel types are prioritized for forwarding packets associated with certain services. Additionally, the network structure may allow first network device 20 and second network device 30 to regulate an amount of traffic forwarded across each tunnel of tunnels 24, 44, 46 such that each tunnel of tunnels 24, 44, 46 is carrying traffic at near a maximum capacity.

In accordance with various aspects of the techniques described in this disclosure, each of tunnels 42, tunnels 44, and tunnels 46 (collectively, "tunnels 42, 44, 46") may link the same pair of nodes (e.g., first network device 20 and second network device 30) such that a packet may travel between first network device 20 and second network device 30 via any one or more of tunnels 42, 44, and/or 46 in various different ways according to their respective characteristics. As such, it may be beneficial for first network device 20 and/or second network device 30 to control a number of packets that are forwarded over each tunnel of tunnels 42, 44, 46.

A packet may, in some cases, be associated with one or more services of a set of services provided by service host devices 22. For example, each packet forwarded and/or received by first network device 20 and second network device 30 (collectively, "network devices 20, 30") may include a packet header which indicates one or more service colors that identify one or more services associated with the packet.

Although described with respect to packet headers, first network device 20 and second network device 30 may maintain, for any given flow, state information indicating a service color for each flow. As such, first network device 20 and second network device 30 may select the corresponding tunnel without inspecting each individual packet header and instead reference the state information for the corresponding flow to identify the corresponding service color and then the referenced tunnel color defined by the tunnel hierarchy. That is, the tunnel picking may, in some cases, be pre-determined solely based on the service route coloring without having to look at packet headers distinguishing different packets (for the same flow) which may otherwise (e.g., other than class of service—COS—marking) share the flow-identifying fields. In this respect, first network device 20 may only utilize the color-marking on the service routes and the tunnel along with the color hierarchy configuration to select the tunnel (and without referencing any color marking in the packets).

In any event, controller 10 may assign one or more tunnel colors to each of tunnels 42, 44, 46. In this way, network devices 20, 30 may parse a packet header of a packet to determine a service color associated with the packet and determine one or more of tunnels 42, 44, 46 in which to forward the packet based on the tunnel hierarchy structure and the one or more tunnel colors associated with each of tunnels 42, 44, 46.

Controller 10, in one example, may include one or more processors that are configured to implement functionality and/or process instructions for execution within network system 2. Controller 10 may include, for example, microprocessors, digital signal processors (DSPs), application specific integrated circuits (ASICs), field programmable gate array (FPGAs), or equivalent discrete or integrated logic circuitry, or a combination of any of the foregoing devices or circuitry. In the example illustrated in FIG. 1, controller 10 includes storage device 12 and tunnel hierarchy unit 14. Controller 10, based on data from user interface 16, may be configured to generate information indicative of one or more tunnel hierarchy components, where first network device 20 and second network device 30 are configured to generate a tunnel hierarchy structure based on the one or more tunnel hierarchy components.

Storage device 12 may be configured to store information within controller 10 during operation. Storage device 12 may include a computer-readable storage medium or computer-readable storage device. In some examples, storage device 12 includes one or more of a short-term memory or a long-term memory. Storage device 12 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 12 are used to store program instructions for execution by controller 10. Storage device 12 may be used by software or applications running on controller 10 to temporarily store information during program execution.

Tunnel hierarchy unit 14 may, in some examples, be configured to generate information indicative of one or more tunnel hierarchy components which include associations between at least one tunnel color and at least one service color. For example, tunnel hierarchy unit 14 may generate information which associates a respective service color with one or more tunnel colors. In some cases, the information associates the respective service color with a primary tunnel color and a secondary tunnel color. Such information, when exported to network devices 20, 30, may cause network devices 20, 30 to update the tunnel hierarchy structure to link the service color with the primary tunnel color and the secondary tunnel color.

In some examples, when network device 20 receives a packet associated with the service color, first network device 20 may determine whether one or more tunnels associated with the primary tunnel color are activated, or "online." If one or more tunnels associated with the primary tunnel color are activated, first network device 20 may forward the packet to second network device 30 over a tunnel associated with the primary tunnel color. On the other hand, if no tunnels associated with the primary tunnel color are activated, first network device 20 may determine whether one or more tunnels associated with the secondary tunnel color are activated. If one or more tunnels associated with the secondary tunnel color are activated, first network device 20 may forward the packet to second network device 30 over a tunnel associated with the secondary tunnel color. In this way, tunnel hierarchy unit 14 may generate information which forms the tunnel hierarchy structure defining an order of preference in which network devices 20, 30 forward packets over tunnels 42, 44, 46.

User interface 16 may be a device or set of devices for interacting with and/or managing interactions, input, and/or output with one or more service provider users. Accordingly, user interface 16 may include any now-known or hereinafter developed device for such interactions (e.g., keyboard, pointing device, microphone(s), touchscreen device(s), buttons, keypads, lights, microphone(s) and/or audio speaker(s) for voice commands, responses, and/or other interactions, display device(s), touchscreen device(s), or any combination thereof. If included within the user interface 16, a display may include any combination of a liquid crystal display (LCD), light-emitting diodes (LEDs), or organic light-emitting diodes (OLEDs). In some examples the display may include a touch screen or other physical or direct interaction device.

User interface 16 may be configured to display any information related to services, tunnels, first network device 20, second network device 30, or other information. The input may be, for example, in the form of pressing a button on a keypad or selecting an icon from a touch screen. In some examples, the input may include a selection of a one or more tunnel colors to map to a service color. In these examples, controller 10 may, based on such input, create information indicative of one or more tunnel hierarchy components which associate the one or more tunnel colors with the service color. User interface 16 may, in some cases, be electrically coupled to controller 10. Alternatively, or in addition, user interface 16 may wirelessly communicate with controller 10. In some cases, user interface 16 and controller 10 may be integrated into a single unit having a single housing.

Network devices 20, 30, in some cases, may each include a router such as a provider edge or customer edge router, a core router, or another type of network device, such as a switch. In this example, network devices 20, 30 each include a control unit (not illustrated in FIG. 1) that provides control plane functionality for the device. Additionally, network devices 20, 30 may each include one or more forwarding units (not illustrated in FIG. 1) that provide a data plane for processing network traffic.

First network device 20 and second network device 30 receive and send data packets via interfaces of interface cards 21A-21C ("IFCs 21") and via interfaces of interface cards 31A-31C ("IFCs 31"), respectively. Each of IFCs 21 and IFCs 31 (collectively, "IFCs 21, 31") may represent a separate line card insertable within a chassis (not shown) of network devices 20, 30. Example line cards include flexible programmable integrated circuit (PIC) concentrators (FPCs), dense port concentrators (DPCs), and modular port concentrators (MPCs). Each of IFCs 21, 31 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of network devices 20, 30 may include more or fewer IFCs.

Tunnels 42, 44, 46 may include, for example, any combination of Generic Routing Encapsulation (GRE), User Datagram Protocol (UDP) tunnels, Resource Reservation Protocol-Traffic Engineering (RSVP-TE) tunnels, RSVP-TE auto-mesh tunnels, Label Distribution Protocols (LDP) tunnels, Border Gateway Protocol-Labeled Unicast (BGP-LU) tunnels, BGP Segment Routing-Traffic Engineering (BGP SR-TE) tunnels, Static Label-Switched Path (LSP) tunnels, Static SR-TE tunnels, Open Shortest Path First/ISIS-Segment Routing (OSFP/ISIS-SR) tunnels, and SRv6 tunnels, which are examples of types of tunnels. In a network such as network system 2 with data-traffic being sent over tunnels 42, 44, 46 between a pair of nodes such as first network device 20 and second network device 30, a subset of tunnels of tunnels 42, 44, 46 may be preferred for carrying network traffic. In some examples, a first set of tunnels that is more preferred for forwarding network traffic of a particular service than a second set of tunnels may be of a different tunnel type than the second set of tunnels. In some cases, a set of tunnels may be preferred equally with a preferred volumetric split of network traffic between the tunnels.

When each tunnel of a set of tunnels are of the same tunnel type, controller 10 may configure a forwarding paradigm to use across the set of tunnels. When configuring tunnels, it is typical to configure a tunnel in a manner that completely describes the attributes of that tunnel without creating too many dependencies on other tunnels. However, when the tunnels may be of different types it may be more difficult for controller 10 to configure the paradigm that accurately captures the tunnel-usage-paradigm that may involve multiple tunnels (including possibly tunnels of different types). It may be beneficial to develop an abstraction to specify the forwarding paradigms specifying the relationships among more than one tunnels.

Controller 10, in some examples, may generate information indicative of an instruction to associate a tunnel of tunnels 42, 44, 46 with one or more tunnel colors. For example, controller 10 may generate the following segment of computer code in order to associate a color of a BGP SR-TE tunnel:

```
SR Policy SAFI NLRI: <Distinguisher, Policy-Color, Endpoint>
Attributes:
    Tunnel Encaps Attribute (23)
        Tunnel Type: SR Policy
            Binding SID
            Preference
            Priority
            Policy Name
            Explicit NULL Label Policy (ENLP)
            Segment List
                Weight
                Segment
                Segment
                ...
    ...
```

The identifiers "Policy-Color" and "Endpoint" may represent the one or more colors to be associated with the respective tunnel of tunnels 42, 44, 46 and an endpoint of the respective tunnel, respectively.

In some examples, controller 10 may generate the following segment of computer code in order to associate three different tunnels with respective tunnel colors:

```
protocols {
    mpls {
        label-switched-path ct-1 { ...
            color 100;
            ...
        }
        label-switched-path ct-2 { ...
            color 200;
```

```
                }
            static-label-switched-path lsp {
                ingress { ...
                    color 25;
                ...
                }
            }
        }
    }
```

For example, "label-switched-path ct-1," "label-switched-path ct-2," and "static-label-switched-path lsp" may represent three different tunnels of tunnels 42, 44, 46, where label-switched-path ct-1 is linked to "color 100," label-switched-path ct-2 is linked to "color 200," and static-label-switched-path lsp is linked to "color 25."

Although examples of computer code for associating tunnels 42, 44, 46 with one or more tunnel colors are described herein, controller 10 may generate other example segments of computer code or other forms of information for associating one or more of tunnels 42, 44, 46 with one or more tunnel colors. After generating the information indicative of the instruction to associate a tunnel of tunnels 42, 44, 46 with one or more tunnel colors, controller 10 may export the information indicative of the instruction to associate the tunnel with one or more tunnel colors to one or both of network devices 20, 30. In turn, one or both of network devices 20, 30 may store the association of the tunnel with the one or more tunnel colors in a respective memory (not illustrated in FIG. 1). In this way, first network device 20 may be configured to identify a list of tunnel colors associated with each tunnel of tunnels 42, 44, 46.

In some examples, Tunnel hierarchy unit 14 may generate information including an instruction to associate a service color with one or more tunnel colors. In turn, controller 10 may send the information to one or both of network devices 20, 30. Based on the information including the instruction to associate the service color with the one or more tunnel colors, one or both of network devices 20, 30 may update a tunnel hierarchy structure to link the service color to the one or more tunnel colors. The following segment of computer code may represent an example of the information generated by tunnel hierarchy unit 14 which includes the instruction to associate the service color with the one or more tunnel colors:

```
routing-options {
    color-hierarchy {
        # Tunnels colored 100 carry traffic, if they fail then tunnels
        colored 200 carry the traffic
        color 300 {
            color 100 {
                primary;
            }
            color 200 {
                fallback;
            }
        }
        # "Balance" provides semantic of weighted-ECMP
        #
```

```
        color 600 {
            color 400 {
                balance 20;
            }
            color 500 {
                balance 80;
            }
        }
    }
}
```

In this example, "color 300" may represent a service color that may be associated with one or more packets received by one or both of network devices 20, 30. Additionally, "color 100" may represent a primary tunnel color linked to color 300 and "color 200" may represent a fallback, or secondary, tunnel color linked to the service color. In this way, the example segment of computer code which links color 100 and color 200 to color 300 may cause first network device 20 to forward a packet associated with color 300 over a tunnel assigned to color 100 if at least one tunnel assigned to color 100 is online. If no tunnels assigned to color 100 are online, network device 20 may forward the packet to second network device 30 over a tunnel assigned to color 200.

Although the example segment of computer code links a service color to one primary tunnel color and one fallback (e.g., secondary) tunnel color, other examples of computer code may link a service color to a primary tunnel color and any number of fallback tunnel colors. In this example, "color 600" may represent a service color that may be associated with one or more packets received by one or both of network devices 20, 30. Additionally, "color 400" may represent a first tunnel color linked to color 600 and "color 500" may represent a second color linked to the service color. The segment of computer code indicates that 20% (e.g., balance 20) of network traffic of color 600 is to be forwarded over tunnels of color 400 and 80% (e.g., balance 80) of network traffic of color 600 is to be forwarded over tunnels of color 500.

In some examples, a network device, such as first network device 20 includes a control unit (not illustrated in FIG. 1) and a forwarding unit (not illustrated in FIG. 1). The forwarding unit may include a forwarding manager including a memory (e.g., a server) configured to store the tunnel hierarchy structure. The tunnel hierarchy structure may link each service color of one or more service colors to a respective one or more tunnel colors. For example, the tunnel hierarchy structure may link a service color to a primary tunnel color and one or more fallback tunnel colors. The forwarding unit may include a packet processor configured to receive, via an IFC of IFCs 21, a packet including a packet header which indicates a service corresponding to the packet.

To illustrate, first network device 20 may receive the packet from a service host device of service host devices 22. The forwarding manager may be configured to parse the packet header in order to identify the service corresponding to the packet, where the service is associated with a service color. In some examples, the service may include a BGP-signaled service such as any one or more of a Layer 3 Virtual Private Network (L3VPN) service, an Ethernet VPN (EVPN) service, a Layer 2 VPN (L2VPN) service, a family inet service, a family inet6 service, a BGP Virtual Private Local Area Network Service (BGP VPLS), and a Next-Generation Multicast Virtual Private Network (NG-MVPN) service. In some examples, the service may include an LDP-signaled service such as an LDP VPLS service and/or a Virtual Private Wire Service (VPWS). The forwarding unit may be configured to identify, based on the tunnel hierarchy structure, a set of tunnels, where each tunnel of the set of tunnels is associated with a tunnel color. For example, the tunnel hierarchy structure may link the service color to the tunnel color as a primary tunnel color.

The set of tunnels associated with the primary tunnel color may, in some examples, include tunnels 42. In turn, the forwarding unit of first network device 20 may determine whether at least one tunnel of tunnels 42 is in an online state. A tunnel of tunnels 42 that is in an online state may, in some cases, be configured to carry network traffic between first network device 20 and second network device 30. On the other hand, a tunnel that is in an offline state might not be able to carry packets or may have a diminished capacity for carrying packets. In some examples, first network device 20 may be configured to perform one or more tests to determine whether each tunnel of tunnels 42 is in an online state or in an offline state. Additionally, or alternatively, first network device 20 may receive information indicating that one or more tunnels of tunnels 42 has transitioned from an offline state to an online state or transitioned from an online state to an offline state. First network device 20 may maintain a record of tunnels 42, indicating whether each tunnel of tunnels 42 are online or offline.

In some examples, the forwarding manager of first network device 20 determines that at least one tunnel of tunnels 42 is in an online state, where each tunnel of tunnels 42 is associated with a primary tunnel color that is linked to a service color by the tunnel hierarchy structure stored in a memory of first network device 20. Subsequently, the forwarding manager is configured to select a tunnel (e.g., tunnel 42B) of tunnels 42 for forwarding a packet associated with the service color. The forwarding manager may select a tunnel of tunnels 42 that the forwarding manager determines to be in an online state. The packet processor of first network device 20 may forward the packet to second network device 30 over the tunnel selected by the forwarding manager. In some examples, the forwarding manager may select the tunnel of tunnels 42 in which to forward the packet in order to balance a load of network traffic travelling through tunnels 42. For example, if three tunnels of tunnels 42 are in an online state, the forwarding manager may distribute packets associated with the service color substantially evenly over the three tunnels of tunnels 42 that are in an online state.

In some examples, the forwarding manager of first network device 20 determines that no tunnels of tunnels 42 are in an online state, where each tunnel of tunnels 42 is associated with a primary tunnel color that is linked to a service color by the tunnel hierarchy structure stored in a memory of first network device 20. The forwarding manager may identify, based on the tunnel hierarchy structure, tunnels 44, where each tunnel of tunnels 44 is associated with a secondary tunnel color linked to the service color in the tunnel hierarchy structure. The secondary tunnel color may represent a fallback tunnel color. For example, first network device 20 may, in some cases, forward a packet associated with the service color over tunnels 44 only if none of tunnels 42 are in an online state, thus making tunnels 44 a fallback, or a backup option, to tunnels 42. The forwarding manager of first network device 20 may determine whether at least one tunnel of tunnels 44 is in an online state. In some examples, first network device 20 may be configured to perform one or more tests to determine whether each tunnel of tunnels 44 is in an online state or in an offline state. Additionally, or alternatively, first network device 20 may receive information indicating that one or more tunnels of tunnels 44 has transitioned from an offline state to an online state or transitioned from an online state to an offline state. First network device 20 may maintain a record of tunnels 44, indicating whether each tunnel of tunnels 44 are online or offline.

In some examples, the forwarding manager of first network device 20 determines that at least one tunnel of tunnels 44 is in an online state, where each tunnel of tunnels 44 is associated with a secondary tunnel color that is linked to a service color by the tunnel hierarchy structure stored in a memory of first network device 20. Subsequently, the forwarding manager is configured to select a tunnel (e.g., tunnel 44A) of tunnels 44 for forwarding a packet associated with the service color. The forwarding manager may select a tunnel of tunnels 44 that the forwarding manager determines to be in an online state. The packet processor of first network device 20 may forward the packet to second network device 30 over the tunnel selected by the forwarding manager. In some examples, the forwarding manager may select the tunnel of tunnels 44 in which to forward the packet in order to balance a load of network traffic travelling through tunnels 44. For example, if three tunnels of tunnels 44 are in an online state, the forwarding manager may distribute packets associated with the service color substantially evenly over the three tunnels of tunnels 44 that are in an online state.

In some examples, the forwarding manager of first network device 20 determines that no tunnels of tunnels 44 are in an online state, where each tunnel of tunnels 44 is associated with a secondary tunnel color that is linked to a service color by the tunnel hierarchy structure stored in a memory of first network device 20. The forwarding manager may identify, based on the tunnel hierarchy structure, tunnels 46, where each tunnel of tunnels 46 is associated with a tertiary tunnel color linked to the service color in the tunnel hierarchy structure. The tertiary tunnel color may represent a fallback tunnel color. For example, first network device 20 may, in some cases, forward a packet associated with the service color over tunnels 46 only if none of tunnels 42 and none of tunnels 44 are in an online state, thus making tunnels 46 a fallback, or a backup option, to tunnels 42 and tunnels 44. The forwarding manager of first network device 20 may determine whether at least one tunnel of tunnels 46 is in an online state. In some examples, first network device 20 may be configured to perform one or more tests to determine whether each tunnel of tunnels 46 is in an online state or in an offline state. Additionally, or alternatively, first network device 20 may receive information indicating that one or more tunnels of tunnels 46 has transitioned from an offline state to an online state or transitioned from an online state to an offline state. First network device 20 may maintain a record of tunnels 46, indicating whether each tunnel of tunnels 46 are online or offline.

In some examples, the forwarding manager of first network device 20 determines that at least one tunnel of tunnels 46 is in an online state, where each tunnel of tunnels 46 is associated with a tertiary tunnel color that is linked to a service color by the tunnel hierarchy structure stored in a memory of first network device 20. Subsequently, the forwarding manager is configured to select a tunnel (e.g., tunnel 46B) of tunnels 46 for forwarding a packet associated with the service color. The forwarding manager may select a tunnel of tunnels 46 that the forwarding manager determines to be in an online state. The packet processor of first network device 20 may forward the packet to second network device 30 over the tunnel selected by the forwarding manager. In some examples, the forwarding manager may select the tunnel of tunnels 46 in which to forward the packet in order to balance a load of network traffic travelling through tunnels 46. For example, if three tunnels of tunnels 46 are in an online state, the forwarding manager may distribute packets associated with the service color substantially evenly over the three tunnels of tunnels 46 that are in an online state.

In some examples, the tunnel hierarchy may link a respective service color to any one or more tunnel colors, and controller 10 may output information to assign one or more tunnel colors to each tunnel of tunnels 42, 44, 46. As such, controller 10 may change the tunnel color(s) associated with each tunnel of tunnels 42, 44, 46 and thus change a manner in which network devices 20, 30 forward packets. Second network device 30 may receive a packet from first network device 20 via a tunnel of tunnels 42, 44, 46. In turn, second network device 30 may forward the packet to one of customer edge devices 32 via a respective one of IFCs 31. A packet header of the packet received from first network device may identify a customer edge device of customer edge devices 32 in which to forward the packet. Although first network device 20 is described herein as forwarding packets to second network device 30 via tunnels 42, 44, 46 based on the tunnel hierarchy structure, in some cases, second network device 30 may be configured to forward packets to first network device 20 based on the tunnel hierarchy structure.

Figure 2:
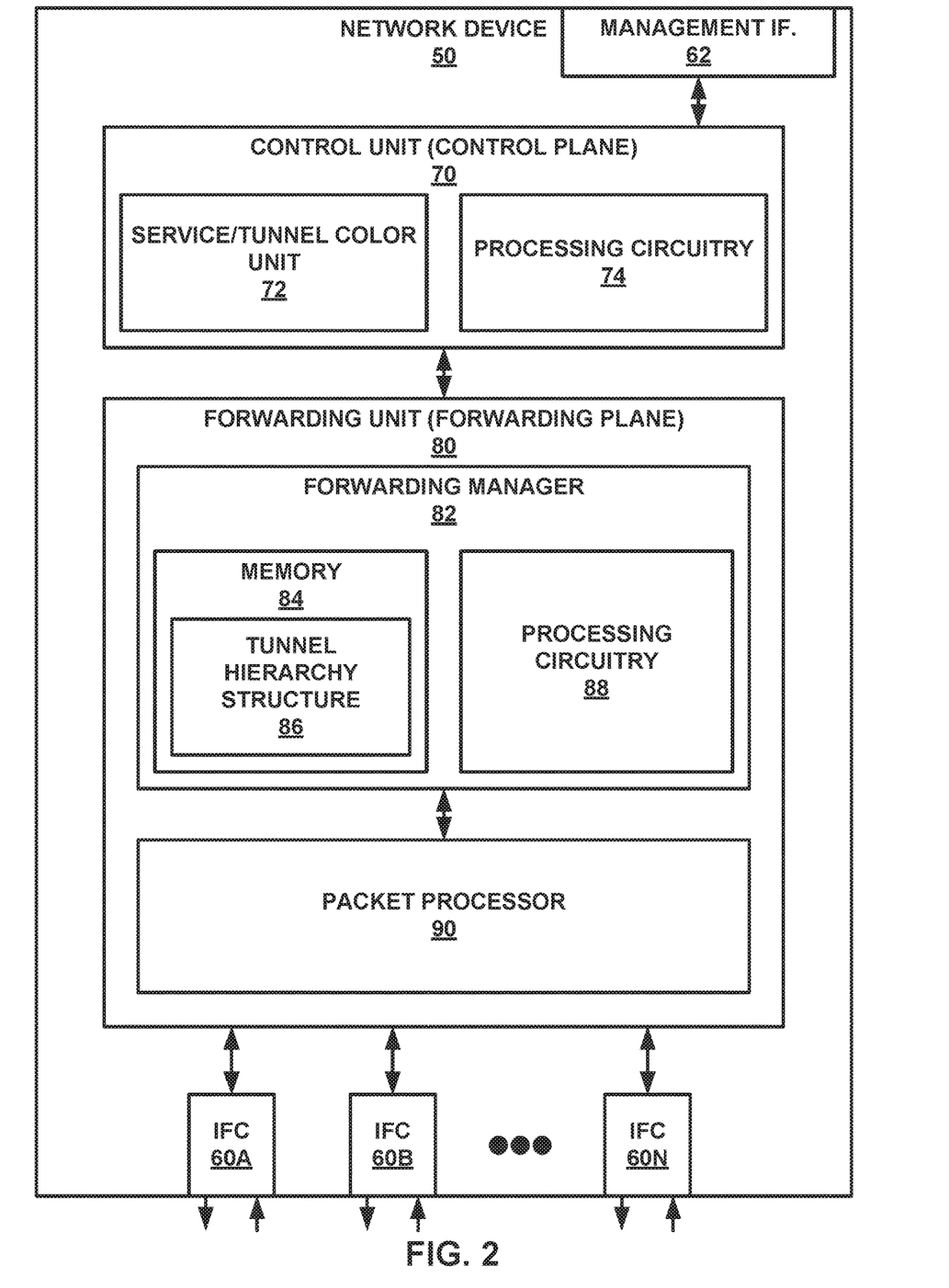
FIG. 2 is a block diagram illustrating an example of a network device, in accordance with one or more techniques of this disclosure.

FIG. 2 is a block diagram illustrating an example of a network device 50, in accordance with one or more techniques of this disclosure. As seen in FIG. 1, network device 50 includes IFCs 60A-60N (collectively, "IFCs 60"), management interface 62, control unit 70, and forwarding unit 80. Control unit 70 includes service/tunnel color unit 72 and processing circuitry 74. Forwarding unit 80 includes forwarding manager 82, memory 84, tunnel hierarchy structure 86, processing circuitry 88, and packet processor 90. In some examples, network device 50 may be an example of first network device 20 of FIG. 1 and IFCs 60 may be an example of IFCs 21 of FIG. 1. In some examples, network device 50 may be an example of second network device 30 of FIG. 1 and IFCs 60 may be an example of IFCs 31 of FIG. 1.

Network device 50 may represent a router such as a provider edge or customer edge router, a core router, or another type of network device, such as a switch. In this example, network device 50 includes a control unit 70 that provides control plane functionality for the device. Forwarding unit 80 may provide a data plane for processing network traffic. In this way, forwarding unit 80 may be referred to herein as a "forwarding plane." Forwarding unit 80 may receive and send data packets via interfaces of IFCs 60. Control unit 70 may be connected to each forwarding unit 80 by an internal communication link. The internal communication link may include a 100 Mbps Ethernet connection, for instance. Control unit 70 configures, by sending instructions and other configuration data via the internal communication link, forwarding unit 80 to define control processing operations applied to packets received by forwarding unit 80.

Control unit 70 may execute a plurality of applications, including service/tunnel color unit 72. Service/tunnel color unit 72 may perform, in response to receiving information via management interface 62, one or more operations. In some examples, the one or more operations may include one or more of assigning a tunnel color to one or more tunnels (e.g., one or more tunnels of tunnels 42, 44, 46), linking a service color to one or more tunnel colors such as a primary tunnel color and one or more fallback tunnel colors, and implementing instructions for load balancing network traffic.

Control unit 70 may include processing circuitry 74 that executes software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause processing circuitry 74 to perform techniques described herein. Alternatively, or in addition, control unit 70 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. In some examples, processing circuitry 74 executes one or more operations of service/tunnel color unit 72.

Forwarding unit 80 includes forwarding manager 82, which may perform one or more operations in order to forward packets through packet processor 90. For example, forwarding manager 82 may include memory 84. Memory 84 may be configured to store tunnel hierarchy structure 86. Tunnel hierarchy structure 86 may, in some examples, link each service color of one or more service colors to a set of tunnel colors. In some cases, the set of tunnel colors linked to each service color may include a primary service color and one or more fallback service colors. In this way, when packet processor 90 receives a packet, one or more components of forwarding unit 80 may parse a packet header of the packet to determine a service color associated with the packet. In turn, forwarding unit 80 may determine a tunnel in which to forward the packet based on the set of tunnel colors linked to the service color. Memory 84 may store a list of tunnels that indicates one or more tunnel colors associated with each tunnel on the list of tunnels. Additionally, memory 84 may store a list of services that indicates one or more service colors associated with the list of services. Forwarding manager 82 may update tunnel hierarchy structure 86, the list of tunnels, and the list of services based on one or more instructions received from control unit 70. In some examples, processing circuitry 88 may execute one or more operations to update tunnel hierarchy structure 86, update the list of tunnels stored by memory 84, or update the list of services stored by memory 84.

Forwarding manager 82 may include processing circuitry 88. Processing circuitry 88 may, in some cases, be separate from processing circuitry 74. Processing circuitry 88 that executes software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as RAM (including various forms of DRAM, e.g., DDR2 SDRAM, or SRAM), Flash memory, another form of fixed or removable storage medium that can be used to carry or store desired program code and program data in the form of instructions or data structures and that can be accessed by a processor, or any other type of volatile or non-volatile memory that stores instructions to cause processing circuitry 88 to perform techniques described herein. Alternatively, or in addition, forwarding manager 82 may include dedicated hardware, such as one or more integrated circuits, one or more ASICs, one or more ASSPs, one or more FPGAs, or any combination of one or more of the foregoing examples of dedicated hardware, for performing the techniques described herein.

Forwarding unit 80 includes packet processor 90 that processes packets by performing a series of operations on each packet over respective internal packet forwarding paths as the packets traverse the internal architecture of network device 50. Packet processor 90 of forwarding unit 80, for instance, includes one or more configurable hardware chips (e.g., a chipset) that, when configured by applications executing on control unit 70, define the operations to be performed by packets received by forwarding unit 80. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic.

Operations may be performed, for example, on each packet by forwarding unit 80 or other components of network device 50 to which the packet is directed prior to egress, such as one or more service cards. Packet processor 90 may process packets to identify packet properties and perform actions bound to the properties. Packet processor 90 may include forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, packet processor 90 arranges forwarding path elements as next hop data that can be chained together as a series of "hops" in a forwarding topology along an internal packet forwarding path for network device 50. The result of packet processing determines a manner in which a packet is forwarded or otherwise processed by packet processor 90 of forwarding unit 80 from its input interface on one of IFCs 60 to, at least in some cases, its output interface on one of IFCs 60.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by network device 50 determine one or more control processing operations to be applied to packets by packet processor 90. In network device 50, applications include service/tunnel color unit 72. Applications may configure packet processor 90 to perform the control processing operations by sending, to forwarding unit 80, data representing the control processing operations. Such data may include forwarding path elements representing high-level packet processing requirements (e.g., route lookup and filtering). Control processing operations may include fundamental packet forwarding operations such as input packet processing, route lookup, and output packet processing, as well as service functions such as packet filtering or access control, statistical sampling, traffic policing, rate limiting, and accounting.

Figure 3:
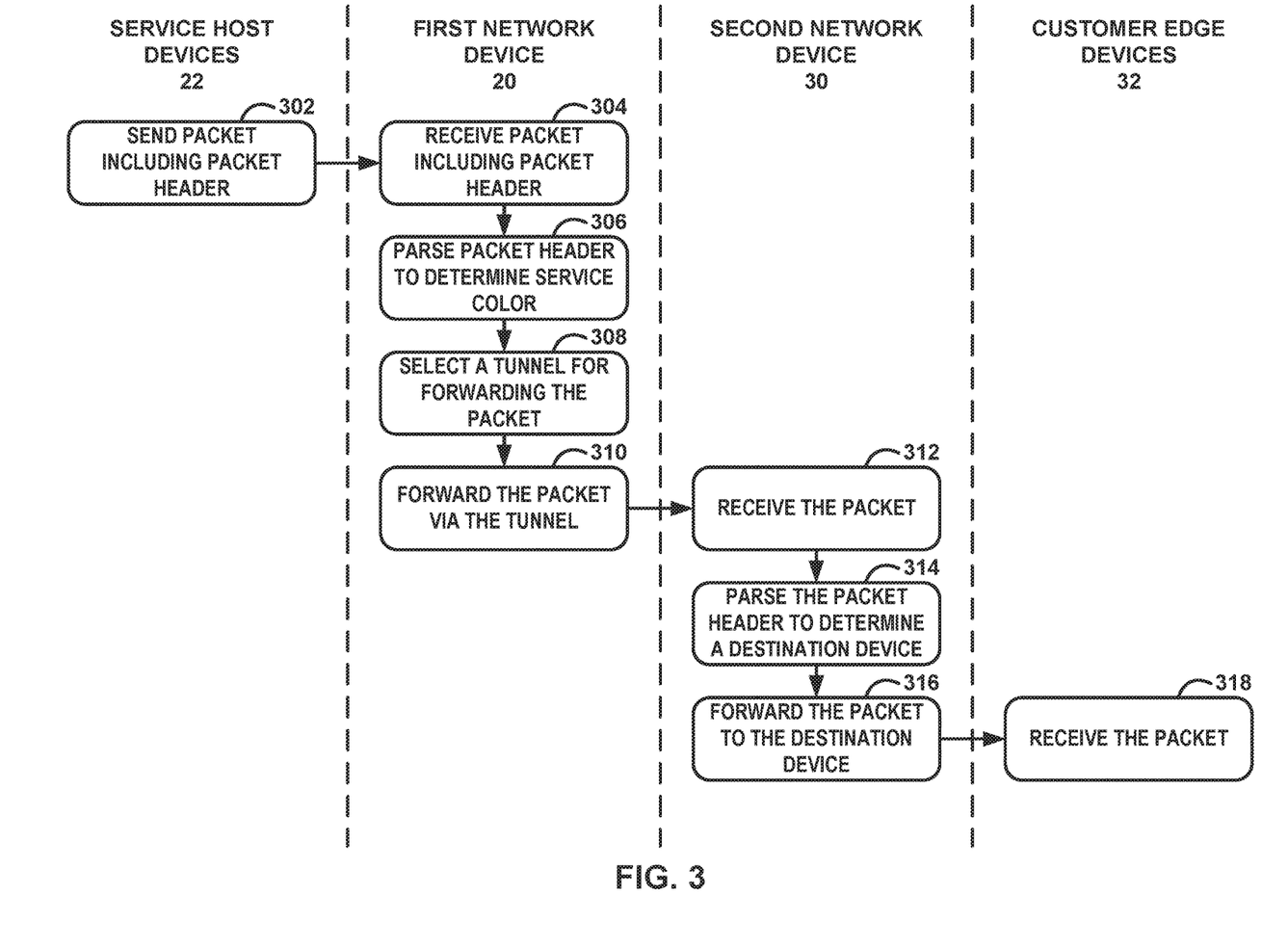
FIG. 3 is a flow diagram illustrating an example operation for forwarding a packet, in accordance with one or more techniques of this disclosure.

FIG. 3 is a flow diagram illustrating an example operation for forwarding a packet, in accordance with one or more techniques of this disclosure. FIG. 3 is described with respect to first network device 20, service host devices 22, second network device 30, customer edge devices 32, and tunnels 42, 44, 46 of FIG. 1. However, the techniques of FIG. 3 may be performed by different components of network system 2 or by additional or alternative devices.

Network system 2 may be configured to deliver one or more services to customer edge devices 32 from service host devices 22. For example, a "service" may include video streaming, email messaging, online browsing, or other transfers of data from one party to another. A user device which is streaming a video, for example, may receive a sequence of packets from a provider edge device. Each packets of the sequence of packets may include a portion of the data required for the user device to stream the video. The sequence of packets including the data for a single video may include a significant number of packets. As such, it may be beneficial for network system 2 to forward the sequence of packets in an efficient manner such that the sequence of packets arrive at a destination (e.g., the user device) in a relatively short amount of time. The example operation of FIG. 3 may improve a manner in which network system 2 forward packets over a manner in which network systems forward packets without performing the example operation of FIG. 3.

As seen in FIG. 3, service host devices 22 send a packet including a packet header (302). For example, a provider edge device (e.g., service host device 22A) of service host devices 22 may send the packet. The packet may be associated with a service, and the service may be indicated in the packet header. For example, the packet header may include a set of bits which indicate the service associated with the packet. Additionally, or alternatively, the packet header may include a set of bits which indicate a service color associated with the packet header, where the service color is tied to a service or a set of services. First network device 20 receives the packet including the packet header (304). First network device 20 parses the packet header to determine a service color (306) that is associated with a service that the packet represents. In some examples, first network device 20 parses the packet header which includes a set of bits identifying the service color assigned to the packet. In some examples, the first network device 20 parses the packet header which includes a set of bits identifying the service assigned to the packet and first network device 20 performs an action to look up a service color that is assigned to the packet. For example, first network device may store a list of services, where the list of services identifies one or more service colors associated with each service on the list of services.

First network device 20 selects a tunnel for forwarding the packet (308). In some examples, first network device 20 selects the tunnel based on a tunnel hierarchy structure stored in a memory of first network device 20. The tunnel hierarchy structure may link one or more service colors to one or more tunnel colors such that each service color of the one or more service colors is linked to a set of tunnel colors. Each respective set of tunnel colors may represent a hierarchy of tunnel colors such that the set of tunnel colors linked to the service color represents a ranking of tunnel colors. Each tunnel of tunnels 42, 44, and 46 may be associated with a tunnel color. First network device 20 may include a list of tunnels that indicates one or more tunnel colors associated with each tunnel in the list of tunnels. As such, first network device 20 may select the tunnel to forward the packet based on the list of tunnels which indicate tunnel color(s) associated with each tunnel and the tunnel hierarchy structure which links the service color associated with the packet to a set of tunnel colors. First network device 20 forwards the packet to second network device 30 (310) via the tunnel selected by first network device 20. Second network device 30 receives the packet (312) and parses the packet header of the packet to determine a destination device (314). For example, the packet header may include a set of bits which identifies the destination device of the packet, such as a customer edge device of customer edge devices 32. Second network device 30 forwards the packet to the destination device (316) and the respective customer edge device of customer edge devices 32 receive the packet (318).

Although the example operation of FIG. 3 includes a flow of network traffic from service host devices 22 to customer edge devices 32, other example operations may include a flow of network traffic from customer edge devices 32 to service host devices 22. First network device 20 may be configured to perform one or more operations described as being performed by second network device 30. Second network device 30 may be configured to perform one or more operations described as being performed by first network device 20.

Although described as originating a packet and forwarding the packet from service host devices 22 to CE devices 32, various aspects of the techniques may be performed with packets received from CE devices 32 and forwarded by second network device 30 via tunnels 42, 44, and/or 46 to first network device 20 for delivery to service host devices 22. Moreover, although described with respect to service host devices 22, various aspects of the techniques may be performed to deliver packet to and receive packets from CE devices (which are connected to first network device 20) or a combination of CE devices and service host devices. Likewise, one or more of CE devices 32 may be replaced with service host devices that couple to second network devices 30 providing various services accessible by the CE devices coupled to the first network device 20.

Figure 4:
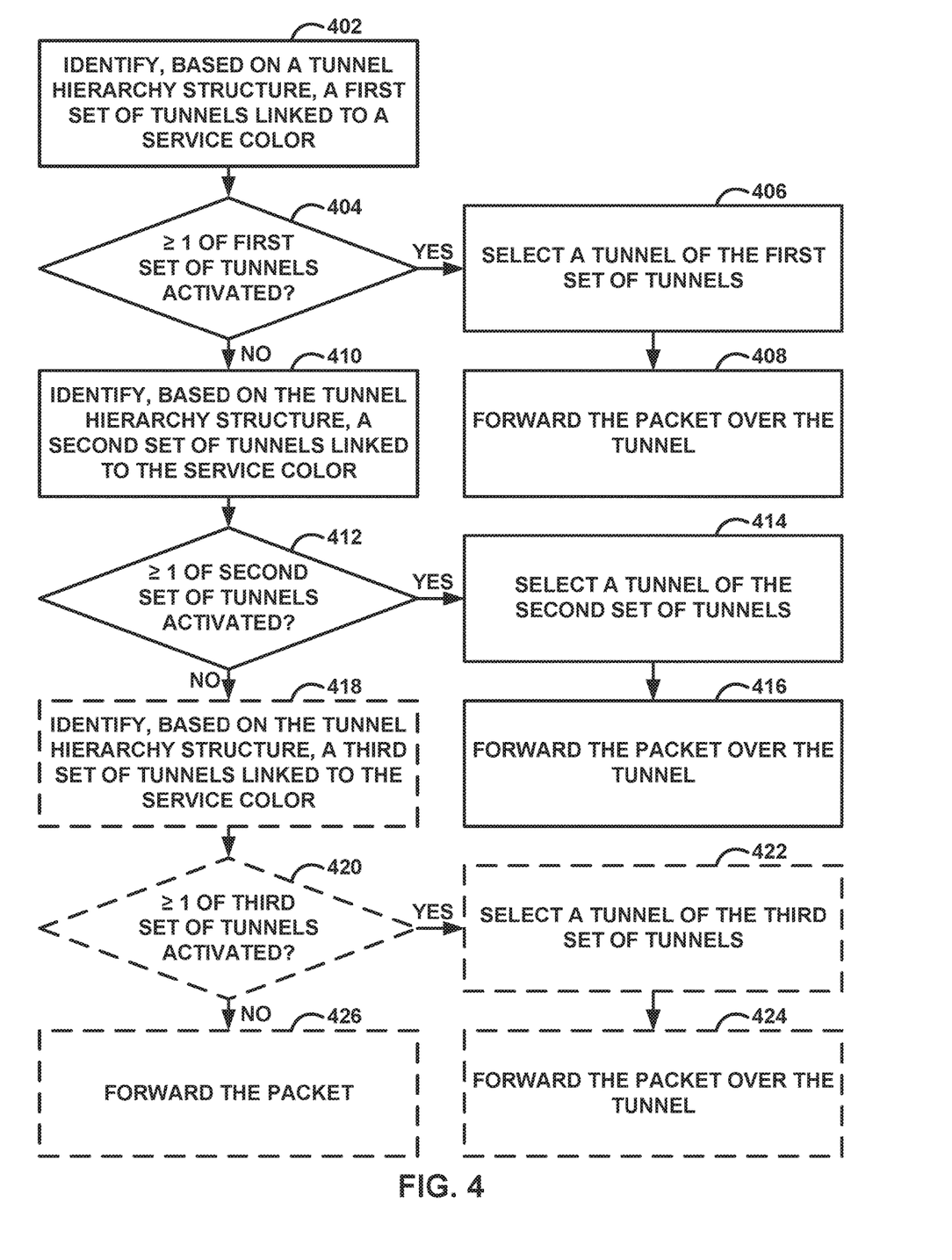
FIG. 4 is a flow diagram illustrating an example operation for selecting a funnel for forwarding a packet, in accordance with one or more techniques of this disclosure.

FIG. 4 is a flow diagram illustrating an example operation for selecting a funnel for forwarding a packet, in accordance with one or more techniques of this disclosure. FIG. 4 is described with respect to first network device 20, service host devices 22, second network device 30, customer edge devices 32, and tunnels 42, 44, 46 of FIG. 1. However, the techniques of FIG. 4 may be performed by different components of network system 2 or by additional or alternative devices. In some examples, the example operation illustrated in FIG. 4 may represent an example operation for performing the FIG. 3 step of "SELECT A TUNNEL FOR FORWARDING THE PACKET" (block 308).

In some examples, a set of tunnels such as tunnels 42, 44, 46 may carry network traffic between a first network device 20 and a second network device 30. Tunnels 42, 44, 46 may include two or more tunnels. In this way, there may be more than one path in which a packet may travel between first network device 20 and second network device 30. Tunnels carry packets similar to a way in which pipes carry water. For example, a rate in which a tunnel may carry packets may be limited to a maximum packet transmission rate. As such, if more than one tunnel connects a pair of nodes, it may be beneficial to control which packets are forwarded over the more than one tunnels in order to efficiently transport network traffic between the pair of nodes. For example, it may be beneficial to control the flow of packets such that a rate of packet flow over each tunnel is close to the maximum rate of packet flow over the respective tunnel. One way to control packet flow over a set of tunnels connecting the same two nodes is to forward a packet over the set tunnels based on one or more services associated with the packet. Additionally, it may be beneficial to balance a load of packets sent over the set of tunnels.

After receiving a packet which includes a packet header, first network device 20 may parse the packet header to determine a service color associated with the packet. Subsequently, first network device 20 may identify, based on a tunnel hierarchy structure, a first set of tunnels linked to the service color (402). The tunnel hierarchy structure may link a group of tunnels to the service color, the first set of tunnels being a part of the group of tunnels. In some examples, the first set of tunnels is associated with a first tunnel color, where the first tunnel color is linked to the service color in the tunnel hierarchy structure. In some examples, the first set of tunnels represent a primary set of tunnels. The primary set of tunnels may be more preferred for forwarding packets associated with the service color than other tunnels. In some examples, the first set of tunnels may include tunnels 42. In such examples, tunnels 42 may be more preferred for forwarding the packet associated with the service color than tunnels 44 and tunnels 46. First network device 20 may determine whether at least one tunnel of the first set of tunnels is activated (404). If first network device 20 determines that at least one tunnel of the first set of tunnels is activated ("YES" branch of block 404), first network device 20 may select a tunnel of the first set of tunnels (406) that is in an online state and forward the packet to second network device 30 over the tunnel (408). In some examples, first network device 20 selects the tunnel in order to load balance network traffic over online tunnels of the first set of tunnels.

If first network device 20 determines that no tunnels of the first set of tunnels are in an online state ("NO" branch of block 404), first network device 20 may identify, based on the tunnel hierarchy structure, a second set of tunnels linked to the service color (410). The second set of tunnels may be a part of the group of tunnels linked to the service color in the tunnel hierarchy structure. In some examples, the second set of tunnels is associated with a second tunnel color, where the second tunnel color is linked to the service color in the tunnel hierarchy structure. In some examples, the second set of tunnels represents a secondary set of tunnels, or a fallback set of tunnels. The secondary set of tunnels may be less preferred for forwarding packets associated with the service color than the primary set of tunnels. However, the secondary set of tunnels may be more preferred for forwarding packets associated with the service color than a tertiary set of tunnels or other tunnels of tunnels 42, 44, 46 that are not linked to the service color in the tunnel hierarchy structure. In some examples, the second set of tunnels may include tunnels 44. In such examples, tunnels 44 may be more preferred for forwarding the packet associated with the service color than tunnels 46, but less preferred for forwarding the packet than tunnels 42. First network device 20 may determine whether at least one tunnel of the second set of tunnels is activated (412). If first network device 20 determines that at least one tunnel of the second set of tunnels is activated ("YES" branch of block 412), first network device 20 may select a tunnel of the second set of tunnels (414) that is in an online state and forward the packet to second network device 30 over the tunnel (416). In some examples, first network device 20 selects the tunnel in order to load balance network traffic over online tunnels of the second set of tunnels.

In some examples, if first network device 20 determines that no tunnels of the second set of tunnels are in an online state ("NO" branch of block 412), first network device 20 may identify, based on the tunnel hierarchy structure, a third set of tunnels linked to the service color (410). The third set of tunnels may be a part of the group of tunnels linked to the service color in the tunnel hierarchy structure. In some examples, the third set of tunnels is associated with a third tunnel color, where the third tunnel color is linked to the service color in the tunnel hierarchy structure. In some examples, the third set of tunnels represents a tertiary set of tunnels (e.g., a fallback set of tunnels). The tertiary set of tunnels may be less preferred for forwarding packets associated with the service color than the primary set of tunnels and the secondary set of tunnels. However, the tertiary set of tunnels may be more preferred for forwarding packets associated with the service color than tunnels connecting first network device 20 and second network device 30 that are not linked to the service color in the tunnel hierarchy structure. In some examples, the third set of tunnels may include tunnels 46. In such examples, tunnels 46 may be less preferred for forwarding the packet than tunnels 42 and tunnels 44. First network device 20 may determine whether at least one tunnel of the third set of tunnels is activated (420). If first network device 20 determines that at least one tunnel of the third set of tunnels is activated ("YES" branch of block 420), first network device 20 may select a tunnel of the third set of tunnels (422) that is in an online state and forward the packet to second network device 30 over the tunnel (424). In some examples, first network device 20 selects the tunnel in order to load balance network traffic over online tunnels of the third set of tunnels. If first network device 20 determines that no tunnels of the third set of tunnels are in an online state ("NO" branch of block 420), first network device 20 may forward the packet to second network device 30 over another tunnel not illustrated in FIG. 1. In some examples, the tunnel hierarchy structure likes more than three or less than three tunnel colors to a service color.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as RAM, read-only memory (ROM), non-volatile random access memory (NVRAM), EEPROM, Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network device comprising:
   a control unit; and
   a forwarding unit comprising:
      a forwarding manager comprising a server configured to store a tunnel hierarchy structure; and
      a packet processor configured to receive, via an interface card of a set of interface cards, a packet comprising a packet header which indicates a service corresponding to the packet, wherein the forwarding manager is configured to:
   parse the packet header in order to identify the service corresponding to the packet, wherein the service is associated with a service color;
   identify, based on the tunnel hierarchy structure, a first set of tunnels, wherein each tunnel of the first set of tunnels is associated with a first tunnel color, the tunnel hierarchy structure representing the first tunnel color as a primary tunnel color corresponding to the service color;
   determine whether at least one tunnel of the first set of tunnels associated with the first tunnel color is in an online state;
   if the forwarding manager determines that no tunnels of the first set of tunnels associated with the first tunnel color are in an online state, the forwarding manager is further configured to:
      identify, based on the tunnel hierarchy structure, a second set of tunnels, wherein each tunnel of the second set of tunnels is associated with a second tunnel color, the tunnel hierarchy structure representing the second tunnel color as a secondary tunnel color corresponding to the service color; and
      determine whether at least one tunnel of the second set of tunnels associated with the second tunnel color is in an online state; and
      forward, based on the determination of whether at least one tunnel of the second set of tunnels associated with the second tunnel color is in an online state, the packet via one of the second set of tunnels.

2. The network device of claim 1, wherein if the forwarding manager determines that at least one tunnel of the first set of tunnels associated with the first tunnel color is in an online state, the forwarding manager is further configured to:

select a tunnel of the at least one tunnel of the first set of tunnels for forwarding the packet, wherein the packet processor is further configured to:
forward the packet to the tunnel.

3. The network device of claim 1, wherein the primary tunnel color identifies tunnels associated with a first tunnel type and the secondary tunnel color identifies tunnels associated with a second tunnel type, wherein the first tunnel type is different than the second tunnel type.

4. The network device of claim 1, wherein if the forwarding manager determines that at least one tunnel of the second set of tunnels associated with the second tunnel color is in an online state, the forwarding manager is further configured to:
select a tunnel of the at least one tunnel of the second set of tunnels for forwarding the packet, wherein the packet processor is further configured to:
forward the packet to the tunnel.

5. The network device of claim 1, wherein if the forwarding manager determines that no tunnels of the second set of tunnels associated with the second tunnel color are in an online state, the forwarding manager is further configured to:
identify, based on the tunnel hierarchy structure, a third set of tunnels, wherein each tunnel of the third set of tunnels is associated with a third tunnel color, the tunnel hierarchy structure representing the third tunnel color as a tertiary tunnel color corresponding to the service color; and
determine whether at least one tunnel of the third set of tunnels associated with the third tunnel color is in an online state.

6. The network device of claim 5, wherein if the forwarding manager determines that at least one tunnel of the third set of tunnels associated with the third tunnel color is in an online state, the forwarding manager is further configured to:
select a tunnel of the at least one tunnel of the third set of tunnels for forwarding the packet, wherein the packet processor is further configured to:
forward the packet to the tunnel.

7. The network device of claim 1, wherein the control unit is configured to:
receive, from a controller, information indicative of a tunnel hierarchy component, the tunnel hierarchy component including an association between at least one tunnel color and the service color; and
send the information indicative of the tunnel hierarchy component to the forwarding manager.

8. The network device of claim 7, wherein the forwarding manager comprises a server, and wherein the forwarding manager is configured to:
modify, based on the information indicative of the tunnel hierarchy component, the tunnel hierarchy structure to include the association between the at least one tunnel color and the service color; and
store the tunnel hierarchy structure in the server.

9. The network device of claim 1, wherein each tunnel of the first set of tunnels connects the forwarding unit to a device.

10. The network device of claim 1, wherein the control unit is configured to:
receive information including instructions to set a color of at least one tunnel of the first set of tunnels; and
send the information including the instructions to set the color of the at least one tunnel of the first set of tunnels to the forwarding unit, wherein the forwarding manager is configured to:
set the color of the at least one tunnel of the first set of tunnels.

11. A method comprising:
receiving, by a packet processor of a forwarding unit, a packet via an interface card of a set of interface cards, the packet comprising a packet header which indicates a service corresponding to the packet;
parsing, by a forwarding manager of the forwarding unit, the packet header in order to identify the service corresponding to the packet, wherein the service is associated with a service color;
identifying, by the forwarding manager and based on a tunnel hierarchy structure stored in a server of the forwarding manager, a first set of tunnels, wherein each tunnel of the first set of tunnels is associated with a first tunnel color, the tunnel hierarchy structure representing the first tunnel color as a primary tunnel color corresponding to the service color;
determining, by the forwarding manager, whether at least one tunnel of the first set of tunnels associated with the first tunnel color is in an online state;
if the forwarding manager determines that no tunnels of the first set of tunnels associated with the first tunnel color are in an online state:
identifying, by the forwarding manager based on the tunnel hierarchy structure, a second set of tunnels, wherein each tunnel of the second set of tunnels is associated with a second tunnel color, the tunnel hierarchy structure representing the second tunnel color as a secondary tunnel color corresponding to the service color;
determining, by the forwarding manager, whether at least one tunnel of the second set of tunnels associated with the second tunnel color is in an online state; and
forwarding, by the packet processor and based on the determination of whether at least one tunnel of the second set of tunnels associated with the second tunnel color is in an online state, the packet via one of the second set of tunnels.

12. The method of claim 11, wherein in response to determining that at least one tunnel of the first set of tunnels associated with the first tunnel color is in an online state, the method further comprises:
selecting, by the forwarding manager, a tunnel of the at least one tunnel of the first set of tunnels for forwarding the packet; and
forwarding, by the packet processor, the packet to the tunnel.

13. The method of claim 11, wherein in response to determining that at least one tunnel of the second set of tunnels associated with the second tunnel color is in an online state, the method further comprises:
selecting, by the forwarding manager, a tunnel of the at least one tunnel of the second set of tunnels for forwarding the packet; and
forwarding, by the packet processor, the packet to the tunnel.

14. The method of claim 11, wherein in response to determining that no tunnels of the second set of tunnels associated with the second tunnel color are in an online state, the method further comprises:

identifying, by the forwarding manager and based on the tunnel hierarchy structure, a third set of tunnels, wherein each tunnel of the third set of tunnels is associated with a third tunnel color, the tunnel hierarchy structure representing the third tunnel color as a tertiary tunnel color corresponding to the service color; and determining, by the forwarding manager, whether at least one tunnel of the third set of tunnels associated with the third tunnel color is in an online state.

15. The method of claim 14, wherein in response to determining that at least one tunnel of the third set of tunnels associated with the third tunnel color is in an online state, the method further comprises:

selecting, by the forwarding manager, a tunnel of the at least one tunnel of the third set of tunnels for forwarding the packet; and forwarding, by the packet processor, the packet to the tunnel.

16. The method of claim 11, wherein the method further comprises:

receiving, by the control unit and from a controller, information indicative of a tunnel hierarchy component, the tunnel hierarchy component including an association between at least one tunnel color and the service color; and sending, by the control unit the information indicative of the tunnel hierarchy component to the forwarding manager.

17. The method of claim 16, wherein the forwarding manager comprises a server, and wherein the method further comprises:

modifying, by the forwarding manager and based on the information indicative of the tunnel hierarchy component, the tunnel hierarchy structure to include the association between the at least one tunnel color and the service color; and storing, by the forwarding manager, the tunnel hierarchy structure in the server.

18. A non-transitory computer-readable medium comprising instructions for causing one or more programmable processors of a network device to:

receive, by a packet processor of a forwarding unit, a packet via an interface card of a set of interface cards, the packet comprising a packet header which indicates a service corresponding to the packet;

parse, by a forwarding manager of the forwarding unit, the packet header in order to identify the service corresponding to the packet, wherein the service is associated with a service color;

identify, by the forwarding manager and based on a tunnel hierarchy structure stored in a server of the forwarding manager, a first set of tunnels, wherein each tunnel of the first set of tunnels is associated with a first tunnel color, the tunnel hierarchy structure representing the first tunnel color as a primary tunnel color corresponding to the service color;

determine, by the forwarding manager, whether at least one tunnel of the first set of tunnels associated with the first tunnel color is in an online state;

if the forwarding manager determines that no tunnels of the set of tunnels associated with the first tunnel color are in an online state, the instructions cause the one or more programmable processors of the network device to:

identify, based on the tunnel hierarchy structure, a second set of tunnels, wherein each tunnel of the second set of tunnels is associated with a second tunnel color, the tunnel hierarchy structure representing the second tunnel color as a secondary tunnel color corresponding to the service color;

determine whether at least one tunnel of the second set of tunnels associated with the second tunnel color is in an online state; and forward, by the packet processor and based on the determination of whether at least one tunnel of the second set of tunnels associated with the second tunnel color is in an online state, the packet via one of the second set of tunnels.

\* \* \* \* \*